United States Patent [19]
Jones, III

[11] Patent Number: 5,715,688
[45] Date of Patent: Feb. 10, 1998

[54] APPARATUS AND METHODS FOR CRYOGENIC TREATMENT OF MATERIALS

[76] Inventor: Robert H. Jones, III, 221 Verot School Rd., Apartment 122, Lafayette, La. 70508

[21] Appl. No.: 654,278

[22] Filed: May 28, 1996

[51] Int. Cl.⁶ .................................... F25D 13/06
[52] U.S. Cl. .................................... 62/63; 62/374
[58] Field of Search ............................ 62/63, 64, 378, 62/375, 374

[56] References Cited

U.S. PATENT DOCUMENTS

| | | | |
|---|---|---|---|
| 3,187,514 | 6/1965 | Rendos | 62/63 |
| 3,605,427 | 9/1971 | Rudy | 62/64 |
| 3,605,428 | 9/1971 | Smith et al. | 62/64 |
| 3,605,987 | 9/1971 | Waldin | 62/64 |
| 3,805,538 | 4/1974 | Fritch, Jr. et al. | 62/63 |
| 3,826,100 | 7/1974 | Vahl | 62/63 |
| 3,881,322 | 5/1975 | Le Diouron | 62/63 |
| 4,569,204 | 2/1986 | Ott et al. | 62/63 |
| 4,852,358 | 8/1989 | Acharya et al. | 62/63 |
| 5,203,820 | 4/1993 | Dibbs | 62/65 |

OTHER PUBLICATIONS

Apr. 1993 "Gases and Systems Technology Worldwide." *AIRCO*.

*Primary Examiner*—Ronald C. Capossela
*Attorney, Agent, or Firm*—Roy, Kiesel & Tucker

[57] ABSTRACT

A device and method for freezing or cooling of food or other items using cryogenic and low temperature coolants is provided. The device includes a coolant container which contains the cryogenic or low temperature coolant. The device will also include a freezing compartment with a lower surface which is immediately adjacent to the coolant container. The coolant container includes a valve for controlling the pressure within the coolant container, and thereby control the temperature of the coolant. When the materials to be cooled are placed in the freezing compartment the coolant will absorb heat from the materials via the lower surface and some of the coolant will vaporize. In a preferred embodiment the device includes a system for collecting the vapors thus created.

27 Claims, 11 Drawing Sheets

APPARATUS AND METHODS FOR CRYOGENIC TREATMENT OF MATERIALS

BACKGROUND OF THE INVENTION

1. Field of the Invention

This invention relates generally to the field of cryogenic and low temperature treatment of materials and, more particularly, pertains to such apparatus and methods which use cryogenic and low temperature coolants such as liquid nitrogen and carbon dioxide.

2. Prior Art

Cryogenic coolants have been used to freeze food products so as to preserve the fresh taste of foods and enhance the quality of the frozen foods. Cryogenic coolants have also been used to cool materials to cryogenic and low temperature levels because such cooling increases the frangibility and brittleness of the materials so cooled. For example, waste materials which might otherwise be difficult to recycle can be processed into fine mesh particles and recycled more efficiently if cooled to low or cryogenic temperatures. Additionally, diverse base materials can be more easily separated if the materials are cooled to low or cryogenic temperatures.

As it relates to food products, the term "freezing" as used herein refers to the solidification or crystallization of water, moisture, and other fluid-like contents such as enzymatic and proteinaceous liquids prior to frozen storage. Freezing shall be sometimes referred to as ultrafreezing. Individually quick frozen (IQF) is a term used in the frozen food industry to refer to products which have been frozen rapidly in individual pieces rather than in block form. Frozen storage refers to the holding of food and other products at constant sub-freezing temperatures. In the United States, frozen storage temperatures are generally construed to be about 0° F. or lower. In Europe, frozen storage temperatures are considered to be about –10° F. and lower. "Cooling" will refer to temperature reduction in materials in general, including but not limited to reduction to temperatures at which freezing of the materials occurs.

The term "cryogenic coolant" refers to a substance which changes from the liquid or solid state to the gaseous state at temperatures of –250° F. and below (at 1 atm pressure). "Low temperature coolant" refers to a substance which changes from the liquid or solid state to the gaseous state at temperatures above –250° F. (at 1 atm pressure), but is capable of freezing or embrittlement of the materials discussed at these higher temperatures. "Cryogenic temperatures" and "low temperatures" are those temperatures associated with cryogenic and low temperature coolants.

Generally, liquid nitrogen ($LN_2$) is an excellent coolant for attaining cryogenic temperature levels, but must be used efficiently to be cost effective. Carbon dioxide ($CO_2$) is also used for freezing at –109° F. and higher. $CO_2$ is a low temperature coolant but not a cryogenic coolant.

In the industry both mechanical and cryogenic (including low temperature coolants) methods are used for IQF processing. Even when cryogenic coolants are used, the item is not instantly frozen uniformly throughout. Although the outer region of an item may be instantly reduced to the low or cryogenic temperature levels, the cooling or freezing times for the inner region vary greatly depending on whether liquid, vapor spray, or directional cooling methods are used. Even with direct immersion of an item into a cryogenic fluid, such as $LN_2$, some time is required for the inner regions of the item to reach the low or cryogenic temperature. Therefore the particular type of cooling which is used is important for the effect it may have on the structure, and thus taste, of the food.

The most commonly used methods for employing cryogenic and low temperature coolants are vapor spraying, liquid spraying, immersion, or combinations of these methods. Another method is to introduce the vapors or fluids of low or cryogenic temperature coolants into a negative pressure chamber which contains the materials to be cooled. In negative pressure or vacuum techniques used for freeze drying the products are frozen and then the fluids of the frozen portions are sublimed or vaporized in the negative pressure chamber.

In a common vapor spraying technique the items are sprayed from above with vapors as the items are conveyed through a tunnel freezer. Generally, the tunnel vapor process utilizes vapors and carbon dioxide snow which is routed from carbon dioxide ($CO_2$) or liquid nitrogen ($LN_2$) storage tanks through transfer lines to perforated tubing running along the tops, sides or bottoms, or all three locations, of insulated tunnels. The vapors may be further circulated for more efficient cooling by fans at the ends or inside of the tunnels. Expended vapors may also be used for precooling of the products prior to entering the tunnel.

Vapor spray methods may also be used in conjunction with liquid spray application as the product is conveyed along the length of the tunnel. This ensures more rapid formation of frozen crusts around the outer area of the products if used at the entry portion of the tunnel and more thorough freezing of the product if used near the exit end of the tunnel.

The liquid spray of $LN_2$ has greater heat absorption capabilities than the vapor spray. Liquid spray procedures may also be used along the entire length of the tunnel if fracturing, rupturing or breakage pose no difficulties, such as when treating rubber and plastic. Fracturing, rupturing, or breakage may occur in food or other materials when freezing occurs too rapidly on the outside of the items due to the different expansion and contraction rates of the frozen outer crusts and unfrozen or warmer inner portions of the items.

In conjunction with, or separate from, the vapor spray or liquid spray tunnel methods, some freezing techniques employ liquid immersion with mechanical refrigeration techniques utilizing such coolants as brine or sodium chloride solutions. Liquid nitrogen immersion may also be performed on food items to attain partial freezing or ice crusts prior to entering the vapor spray or liquid spray section of the tunnel to complete the freezing process at lower temperatures prior to frozen storage. $CO_2$ is used as the immersion medium in some commercial methods.

Some frozen storage facilities may be also be used as freezing chambers. This generally entails expensive insulation costs to keep the facility at the necessary temperatures using mechanical refrigeration. In some cases the food items are placed in the freezer and then sprayed from the top of the freezer with $CO_2$ vapor and dry ice snow. Generally, the use of a frozen storage facility for freezing is inadequate because the freezing rates used are relatively slow.

Another commercial method of freezing is referred to as the spiral or spiral belt freezing system. This consists generally of a conveyor belt in a spiral configuration in a vertical, insulated chamber. $LN_2$ or $CO_2$ vapor or dry ice snow from external tanks is sprayed into the top or bottom of the chamber until the desired temperature levels are attained. This system requires less space than the previously mentioned tunnel systems which generally are 20 to 60 feet in length or even longer in some large volume operations.

Still another freezing technique for food products is the freeze plate or contact method. In this method the products are placed on and between horizontal plates, or adjacent to vertical plates. Refrigerants are circulated through channels inside the plates while some pressure is maintained on the products to sustain close contact between the product and the plates. This method again primarily utilizes commercial refrigerants such as brine, but longer freezing times are required than for the previously discussed procedures.

One characteristic of all freezing procedures is the degree to which they exhibit isothermal or non-isothermal cooling of the materials. In isothermal freezing the temperature at all points around the item to be cooled is the same. This is especially true in the tunnel and spiral systems. A disadvantage of isothermal freezing is that it can lead to fracturing or rupturing of certain food products. The plate or contact freezing procedures are thus desirable for fragile materials because contact freezing uses directional cooling (e.g. bottom to top). However, because such systems are usually mechanical refrigeration systems, long freezing times are required. Long freezing times can also cause a degradation of the taste and overall quality of the food item.

A disadvantage of the tunnel freezing methods which use only spraying for cooling is that they are inefficient because only a relatively small percentage of the vapor or liquid spray actually makes contact with the surface area of the product. This inefficiency results in the expenditure of large amounts of coolant, especially in those systems which seek rapid temperature reduction. Greater amounts of coolant are also required to bring the food items to the desired low temperatures, temperatures which would in a more efficient system, approach the temperature of the coolant.

Another reason spray systems are inefficient is because as the item is sprayed the coolant will be deflected away from the surface of the item. The spray must be continuous to keep the coolant liquid or vapors in constant contact with the surface of the item being cooled. Because of the deflection this method does not make maximum use of the heat absorption capability of the sprayed liquid or vapors.

Spray systems, which transport the coolant from an external storage tank via transfer lines to the tunnel spraying apparatus, will have certain inherent coolant losses each time spraying operations are commenced. The transfer lines and the spraying apparatus will be at ambient temperature because they are separate from the storage tank. Therefore coolant will be expended as the coolant absorbs heat from the transfer lines and the apparatus.

The tunnel volume must also be sufficiently large to accommodate maximum product volume. Since the tunnel volume must essentially be inundated with vapor or liquid spray, product amounts which are less than the maximum volume are frozen less efficiently. Some processing facilities store products until sufficiently large volumes are available for efficient freezing operations. This can be very detrimental to the quality of the frozen product, especially for some seafood products which tend to deteriorate rapidly if they not rapidly frozen to low temperature levels.

As discussed earlier, freezing or cooling too rapidly, which can be done by immersion freezing or by spraying large amounts of vapor or liquid, may also result in fracturing, rupturing, or breakage of many food items. The problem can be overcome by initially forming frozen crusts on the items or allowing only a certain portion of the product to freeze; the remaining portion of the product is therefore frozen at higher temperatures as equilibrium temperatures between that of the colder crusts and that of the higher temperature inner portions are attained. This technique is being used with some success, but, obviously, product size variations may require various crust formation times as well as temperature equilibration times.

The problems just described for some food products may be desirable for some materials which are frozen for embrittlement or frangibility purposes. However, immersion freezing does not lend itself to viable conveyor methods. For example, conveying rubber through a liquid coolant is a tedious procedure. The expense of tunnel injection of large amounts of vapor or spray onto reclamation products which have a low value can be cost prohibitive if efficient methods are not used. Also, sufficient quantities of product must be at hand to fully optimize large volume tunnel designs.

Bacterial growth may also result from damage created by large crystal formation when freezing food products. Bacteria counts are generally higher for items which have been frozen at higher freezing temperatures with lower temperature reduction rates, and bacteria are more easily propagated because of cell wall damage by slower freezing rates of saline and enzymatic fluids within some food products.

For many seafood and meat products, as freezing temperatures are reduced below 32° F., purer water in the tissues freezes out into large ice crystals if slow temperature reduction rates are used. The remaining salt and enzymatic fluids may not freeze until temperature levels below 0° F. are attained. These salts and enzymes are highly corrosive to meat and fat cell walls, and the formation of large frozen ice crystals may further damage cell walls. Textural damage and reduced palatability may be significant due to these factors.

Generally, for all food products except those that are freeze dried, drip loss or loss of product fluids or juices is another factor that can be correlated to large cell ice crystal formation during freezing. This is a factor that is measured routinely on commercial products that are frozen and stored for long periods. Generally, unacceptable levels of drip losses are observed for those products which have been frozen at either warmer temperatures or slower rates, or both, prior to long term frozen storage. For these reasons, low temperatures should be attained as quickly as possible. Frozen storage temperatures should also be as low as economically feasible, preferably −10° F. or lower, to minimize the activity of enzymatic and other fluids. Generally, the higher the water, fat, and enzyme content, the more critical the attainment of low or cryogenic temperature levels and maintenance of low frozen-storage temperatures, preferably −10° F. and below.

What is needed is a cryogenic and low temperature method and apparatus which demonstrates efficiency while providing the capability to cool directionally. The method and apparatus should also be capable of using some of the spray techniques discussed above.

OBJECTS OF THE INVENTION

It is an object of the present invention to provide a cryogenic and low temperature cooling apparatus and method which is more efficient than those currently in use and therefore uses less cryogenic and low temperature coolant than devices and methods currently known in the art.

Another object of the present invention is to more effectively use the latent heats of vaporization of cryogenic and low temperature liquids coolants.

Another object of the present invention is to more effectively use the specific heat capacity of cryogenic and low temperature vapors.

Another object of the present invention is to use the latent heat of vaporization of cryogenic or low temperature coolants to freeze materials to desired low temperatures and also use the vapors which are available for additional cooling, and to do so without directly immersing the materials into the liquid coolant.

Another object of the present invention is to provide an apparatus and method for freezing materials to essentially the temperature of the cryogenic or low temperature coolant used in the apparatus.

Another object of the present invention is to provide more rapid freezing rates than are currently available.

Another object of the present invention is to freeze fragile materials to cryogenic or low temperature levels while minimizing the fracturing, rupturing, or breaking of the products.

Another object of the present invention is to provide for the rapid freezing of saline, enzymatic, and other fluids of food and other organic products so as to minimize corrosive and sharp edge crystal damage to tissue walls of the products.

Another object of the present invention is to provide an apparatus and method for selectively freezing materials to temperatures at, below, or above the standard temperature and pressure (STP) freezing points of the cryogenic or low temperature coolant used.

Another object of the present invention is to minimize the loss of coolant fluids in recooling the freezing space and contiguous components after non-use periods and to minimize or eliminate the need for expensive coolant storage stations.

SUMMARY OF THE INVENTION

A device and process are provided for cryogenic or low temperature cooling of materials. In a preferred embodiment the device includes a coolant containment space which includes a space above the coolant in which vapors from the coolant can be collected. The device also includes a cooling chamber in which the items to be cooled are placed. Cryogenic or low temperature coolant is put in the coolant space. As items are placed in the cooling chamber the items will freeze rapidly to cryogenic or low temperatures as heat from the items is absorbed by the coolant, causing some of the coolant to vaporize. The vapors may be collected and directed into the cooling chamber or to external areas.

An advantage of the invention is that it makes maximum use of the latent heat of vaporization of the coolant and can make further use of the specific heat capacity of the created coolant vapors.

A further advantage of the invention is that the items to be cooled may be directionally cooled from their lower to upper portions.

A feature of the invention is that it is compatible with both cryogenic coolants such as $LN_2$ as well as low temperature coolants such as $CO_2$.

Another feature of the invention is that because the apparatus can be used as the coolant storage tank, the coolant waste associated with restarting operations is minimized or eliminated.

Another feature of the invention is that it may employ several configurations of the cooling chamber to include horizontal, circular, spiral, multi-shelf, and conveyor configurations, or combinations thereof.

These and other objects, advantages, and features of this invention will be apparent from the following descriptions of the invention.

DETAILED DESCRIPTION OF THE PREFERRED EMBODIMENTS

The apparatus and methods of the present invention provide for cooling materials by the use of expendable cryogenic or low temperature coolant. The coolant is contained in a closed insulated coolant containment space. Disposed within or immediately adjacent to the coolant containment space is a cooling chamber into which the materials to be cooled are placed. As the latent heat of vaporization equivalents are absorbed by the coolant from the materials which are in the cooling chamber, some of the coolant will vaporize. These vapors may then be collected and directed as desired.

The invention makes advantageous use of the basic thermodynamic qualities of expendable coolants. One such quality is the latent heat of vaporization. The latent heat of vaporization of a coolant is the transitional heat required to change the coolant from a solid or liquid state to a gaseous state.

The Universal Law for an Ideal Gas explains the behavior of the vapors used in the invention. The law holds that $PV=nRT$ where n=the number of molecular weights of gaseous element or compounds, R=the universal gas constant, P=is pressure, V=volume, and T=temperature. The Universal Law explains the operation of the invention at pressures in the coolant containment space of greater than 1 atm and less than 1 atm so as to create different operating temperatures.

Four of the preferred embodiments of the invention are a horizonal tunnel embodiment, a vertical cylinder with a circular tunnel embodiment, a spiral tunnel embodiment, and a multi-shelf embodiment. A particularly preferred horizontal tunnel embodiment will include a conveyor. Common components to each embodiment are a coolant containment space and a cooling chamber.

The coolant will be at various predetermined levels in the coolant containment space. The minimum amount of coolant which should be in the tank is that amount sufficient to cool the materials for a particular operation cycle. Although reference is made to levels of liquid coolant it is to be understood that for some coolants (such as $CO_2$) the levels referred to herein will be that of the solid coolant.

In one particularly preferred embodiment the lowest predetermined level of the liquid coolant level will be just below the lower surface of the cooling chamber so that the lower surface is contiguous to saturated vapors formed above the liquid coolant. However, one could practice the invention with the coolant at lower levels. At such lower levels the heat from the materials will be absorbed by the coolant vapors and further transmitted to the coolant.

The primary cooling occurs by the absorption of heat by the coolant through the surfaces of the cooling chamber. As the coolant absorbs heat from the items to be cooled via the cooling chamber some of the coolant will vaporize. Additional cooling may be done by directing these vapors to the cooling chamber or elsewhere. Additional cooling could also be done using liquid spray.

Figure 1:
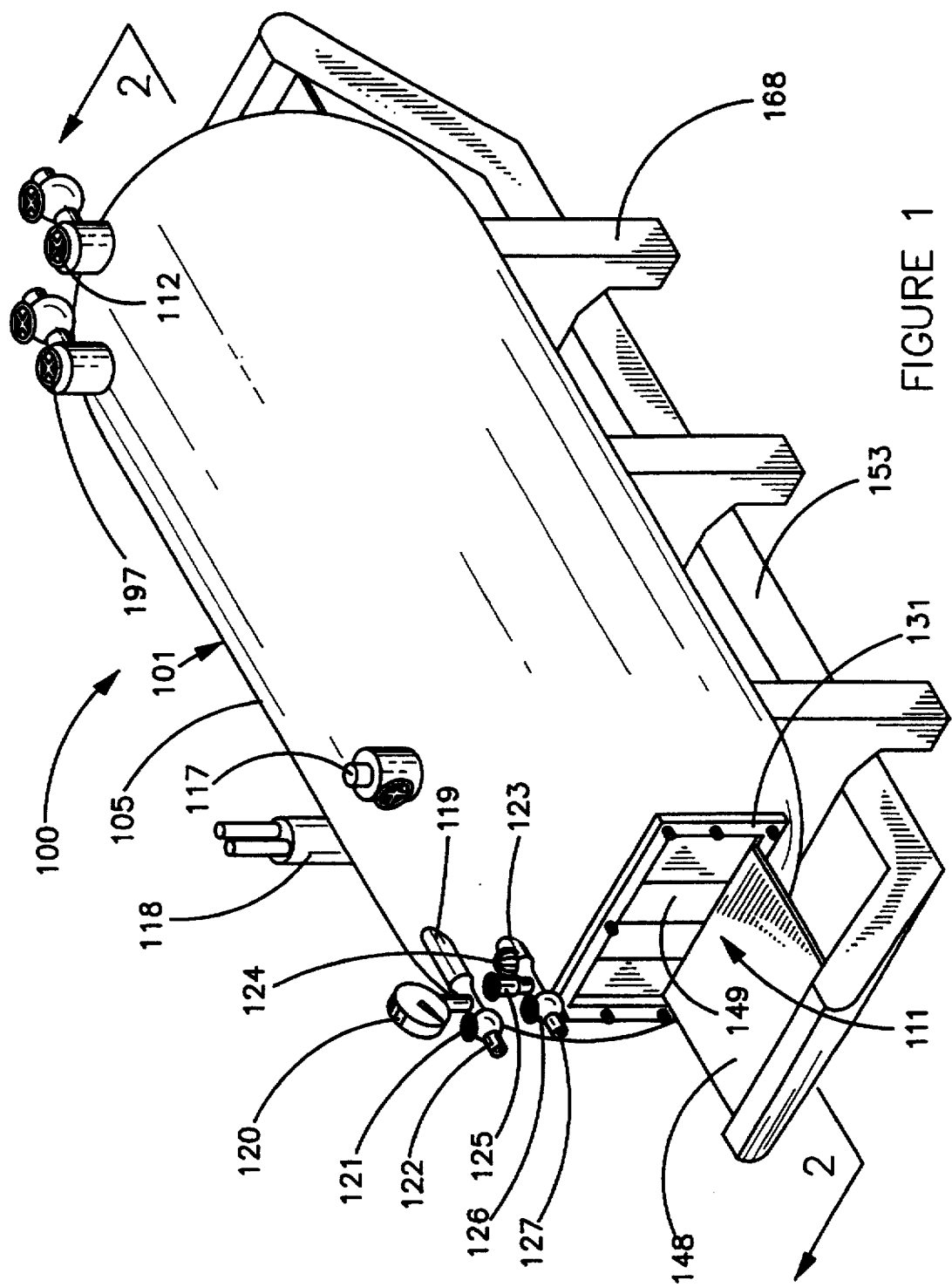
FIG. 1 is a perspective view of a horizontal embodiment of the invention.
Figure 2:
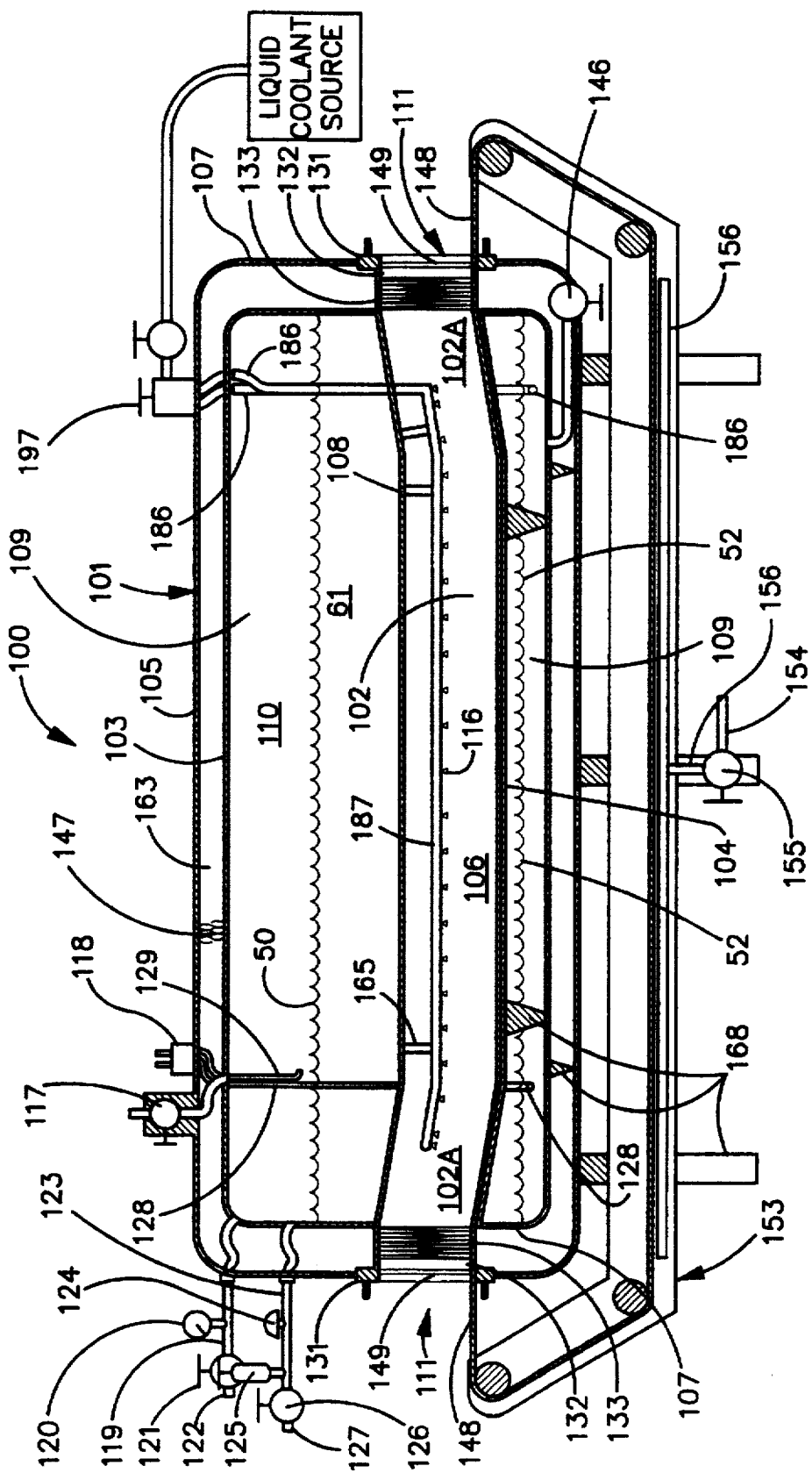
FIG. 2 is a sectional view of a horizontal embodiment of the invention.

FIG. 1 depicts a perspective view of the horizontal tunnel embodiment 100 of the invention with a conveyor belt. FIG. 2 is a sectional view of a horizontal embodiment with a conveyor belt. Horizontal tunnel embodiment 100 includes vessel 101. In one particularly preferred embodiment vessel 101 will be constructed as a pressure vessel with inner shell 103 and outer shell 105 so as to allow the manipulation of the pressure of the coolant within coolant containment space 109. However, one could construct vessel 101 with only a single shell.

In tunnel embodiment 100 cooling chamber 102 is a tunnel disposed within inner shell 103 and extends from one end of vessel 101 to the other. For the tunnel embodiment, cooling chamber 102 is depicted with lower surface 104 which is a wide flat member, vertical sidewalls 106, and a domed top 108, thus seperating cooling chamber 102 from coolant containment space 109 such that a pressure differential may be maintained in cooling chamber 102 and coolant containment space 109. Heads 107 at each end of inner shell 103 connect with the ends of lower surface 104, vertical sidewalls 106, and top 108.

Figure 11:
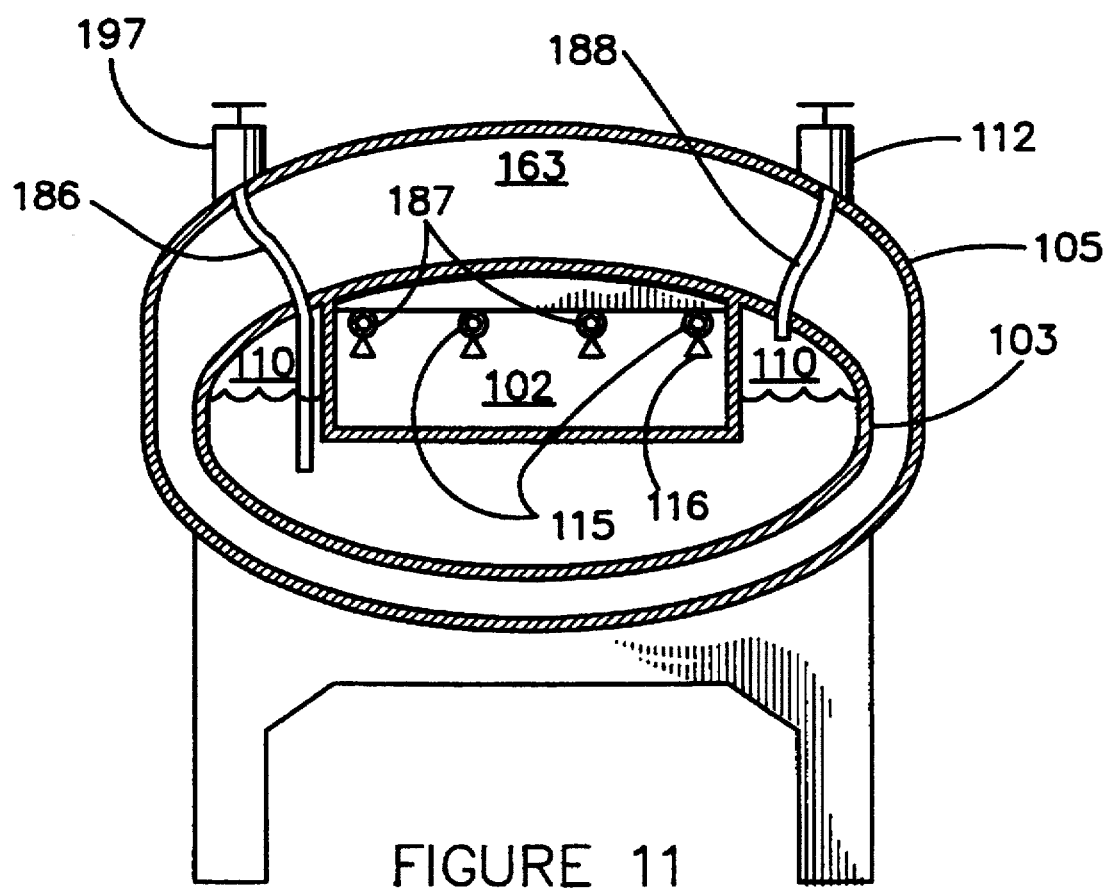
FIG. 11 is a sectional view of a tunnel embodiment of the invention in which the ullage space does not extend over the top of the cooling chamber.

In a particularly preferred embodiment, coolant containment space 109 is formed between cooling chamber 102 and inner shell 103. It is preferable that coolant containment space 109 have an annular shape and include vapor ullage space 110, but one skilled in the art could construct a modified version of tunnel embodiment 100 in which ullage space 110 did not completely surround cooling chamber 102. In one such potential embodiment shown in FIG. 11, ullage space 110 would be that space between cooling chamber 102 and inner shell 103 in which vapors from the coolant could collect. Additionally, inner shell 103 and outer shell 105 could also be terminated above the cooling chamber 102 and cooling chamber could thus be accessible from the top. Such an embodiment would allow access to the items being cooled by persons or machines.

In the tunnel version with annular ullage space 110 items to be cooled will enter and exit the tunnel via entry or exit ports 111. Although the device is shown with two separate entry and exit ports 111, one could construct tunnel embodiment 100 with a single combined port which would serve as a combined entry and exit port 111. Support structures 168 will be used to support cooling chamber 102, inner shell 103, outer shell 105, and horizontal embodiment 100 itself.

In some applications, cooling chamber 102 and inner shell 103 may be exposed to high pressures at cryogenic temperature. For such applications, these components should be designed, fabricated and pressure tested in accordance with Boiler and Pressure Vessel Codes of the ASME or the British Standards Institute to operate at pressures above about 15 psia. The preferred material for the construction of cooling chamber 102, inner shell 103, and all other components containing the coolant in tunnel embodiment 100 is stainless steel, although one skilled in the art could use other materials so long as they withstand the anticipated stresses associated with operating at cryogenic temperatures (and comply with any applicable codes).

It is preferable that lower surface 104 of cooling chamber 102 be designed as thinly as possible. Supports 168 can be used to accommodate such a design provided there is compliance with the pressure vessel codes. Supports 168 used under lower surface 104 should be wedge-shaped to minimized their contact with the outer shell so as to reduce external heat influx and should be made of a material having high strength and low thermal conductivity.

Outer shell 105 may be constructed of stainless steel and may also be constructed of lesser strength materials such as carbon steel as the vacuum jacket 163 between inner shell 103 and outer shell 105 is not exposed to pressures greater than 1-atm (15 psia) and may not necessarily have to conform to the pressure vessel codes.

The dimensions of tunnel embodiment 100, as well as of the other embodiments discussed herein, will of course vary widely for particular applications. In one particular embodiment the following dimensions could be used. Vessel 101 has an overall length of 42 feet, outer shell 105 has a diameter of 95 inches and inner shell 103 has a diameter of 84 inches. Cooling chamber 102 has a 54 inch wide lower surface 104, 12 inch high sidewalls 106, and a 15 inch height from lower surface 104 to the center of top 108.

One preferred tunnel embodiment includes sloped sections 102A, which are sloped upward at each end at an angle not exceeding about 20° where lower surface 104, sidewalls 106 and top 108 are connected to heads 107. For the particular dimensions discussed above, sloped sections 102A measure approximately two feet in length. Sloped sections 102A place lower surface 104 lower than the entry and exit ports 111 and are a means for retaining colder and therefore denser, coolant vapors in cooling chamber 102. Retaining the denser vapors may be especially desirable in certain applications, particularly for processing materials for embrittlement, where directional cooling is not required. The non-sloped cooling chamber would be desirable when the particular application calls for directional or gradient cooling. Although it is preferred to have two sloped sections 102A for the maximum retention of the denser coolant vapors, one could practice the invention with only one sloped section 102A.

Expansion joints 133 and connecting sections 132 are attached between inner shell 103 and outer shell 105 either by welding or bolting and bonding (using low-temperature industrial-grade epoxy glue) to form vacuum jacket 163. Connecting sections 132 are preferably made of grade G-10 plastic or materials having equivalent thermal and strength characteristics. Flanges 131 border entry and exit ports 111. For the dimensions discussed above, flanges 131 at entry and exit ports 111 are approximately 1.0 to 1.5-in. thick.

Figure 3:
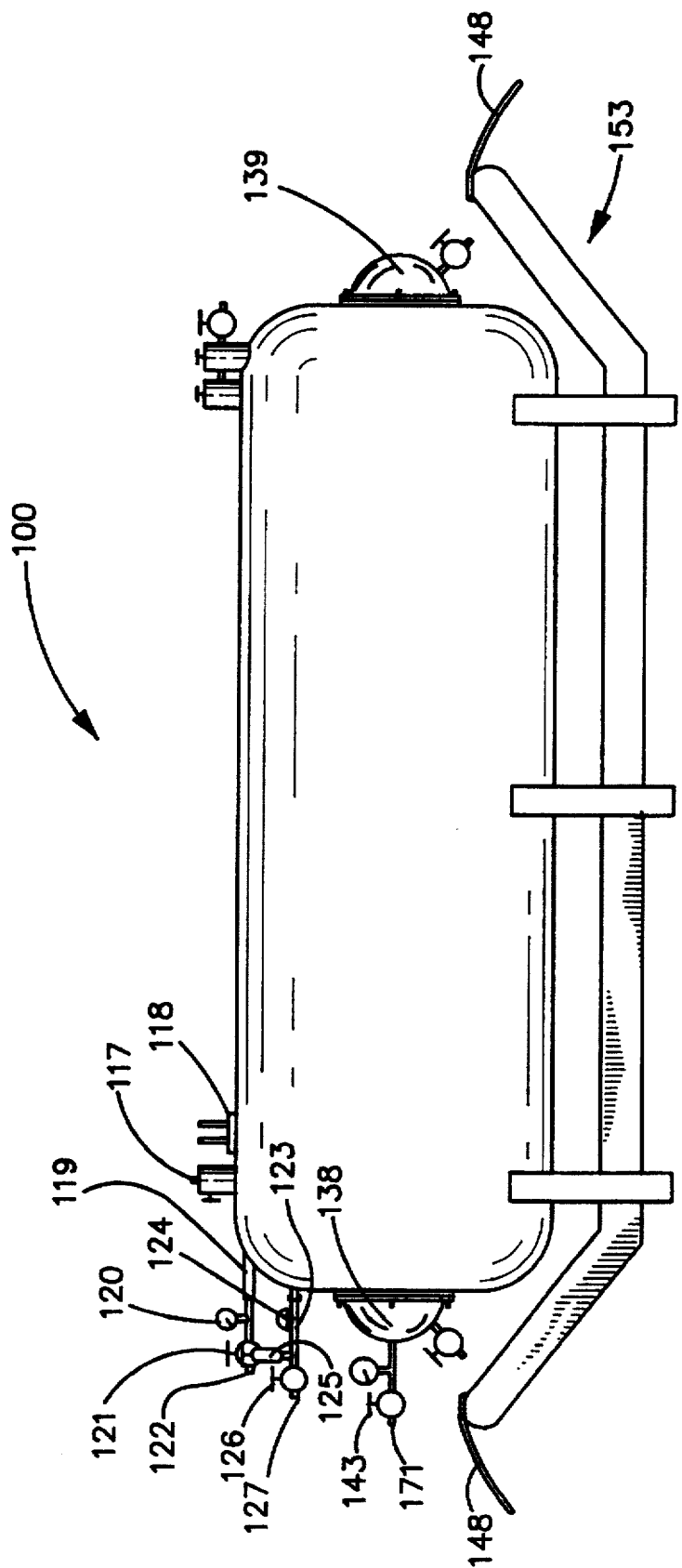
FIG. 3 is a perspective view of a horizontal embodiment of the invention with doors in place for closed operations.

FIG. 3 is a perspective view of tunnel embodiment 100 with doors 138 and 139 in place to create a closed system. Doors 138 and 139 may be attached and sealed to flanges 131 at the entry and exit ends of the tunnel embodiment 100 for stationary operations which will be discussed later.

Conveyor belt 148 is made in detachable sections so that during stationary operations, appropriate sections of conveyor belt 148 may be folded away from vessel 101 so as to allow attachment of doors 138, 139.

For conveyor operations, flaps 149 will help to separate cooling chamber 102 from the ambient environment. Flaps 149 may be made of thin low temperature transparent polyurethane layers or other commercially available low temperature plastic materials with good flexibility characteristics at cryogenic temperature levels. Sheets of thin reflective aluminum or Mylar may be sandwiched, using low-temperature glue, between the layers to provide additional heat reflectivity for the flaps which would preferably be slotted at about three inch intervals. Flaps 149 also provide additional retention of the coolant vapors inside cooling chamber 102. Flaps 149 are designed to be removable to allow attachment of doors 138 and 139 for stationary operations.

Preferably inner shell 103 is wrapped with commercially available, heat-reflective, multi-layer insulation material 147, known in the art as super insulation (SI). In the embodiment shown the SI consists of layers of about 0.006 -mm aluminum foil and 0.15 -mm fiberglass spacing material which are wrapped at a density of 60–75 layers per inch for three inches around inner shell 103, heads 107, expansion joints 133, and plastic connecting sections 132 inside vacuum jacket 163.

In conveyor operations a conveyor means may be used such as conveyor assembly 153 to bring materials into and out of cooling chamber 102 through entry and exit ports 111. Conveyor assembly 153 includes conveyor belt 148 and such other associated components which are commercially available for horizontal, circular, and spiral systems. One skilled in the art may use any number of conveyor means such as the conveyor belts and screw augers which are described herein, or any other means suitable for bringing items into and out of cooling chamber 102.

Materials to be cooled may be loaded onto conveyor belt 148 adjacent to entry port 111 by hand or any number of automated methods. Similarly, after the materials are cooled and have left exit port 111 they may be removed from conveyor belt 148 or dumped from conveyor belt 148 onto another conveyor for subsequent operations or a bin for packaging.

To minimize the formation of frozen condensate from the external atmosphere on conveyor belt 148 after it exits cooling chamber 102, coolant gas can be sprayed into the conveyor assembly 153 from conveyor line 154 via conveyor valve 155 through conveyor dispersion tube 156. If tunnel embodiment 100 were used in an application in which prefreezing was desired, conveyor assembly 153 could be lengthened to extend as far as necessary beyond entry and exit ports 111.

Vacuum jacket 163 is insulated by a high vacuum in addition to SI 147. The low pressure vacuum is created at the fabrication facility and should be generally at a level of <$10^4$ torr. When 1 atm liquid coolant is added to coolant containment space 109 the pressure in vacuum jacket 163 will drop further to provide even greater insulation.

Coolant containment space 109 may be filled with coolant 61 to levels 50, 51, or 52 via upper port valve 117 or lower fill port valve 146. Lower fill port valve 146 may also be used as a coolant drain or transfer port. Both fill port valves are mounted in vacuum-insulated standoffs or the equivalent. Coolant level 50 designates the level at which liquid coolant totally encompasses cooling chamber 102 but leaves the amount of ullage space 110 required by applicable codes (currently 10%). Level 51 designates a coolant level at which the liquid coolant will be in contact with lower surface 104. Level 52 designates a coolant level at which the coolant itself is below lower surface 104. Although these particular levels are described, it will be obvious to those skilled in the art to practice the invention at an infinite number of levels between levels 50, 51, and 52 discussed above.

Pressure differential transmitter 118, for monitoring and maintaining the liquid coolant level, communicates with pressure sensor tube 128 and pressure sensor tube 129. Pressure sensor tube 128 is below the surface of liquid coolant 61 and pressure sensor tube 129 is in ullage space 110.

Transmitter 118 signals a solenoid control sensor in the coolant fill line (not shown) to affect coolant flow from an external coolant source. The liquid coolant level may be accurately maintained such that when the coolant level drops below a predetermined setting, the solenoid activates the fill line. In one embodiment, the coolant fill line will remain attached during operation of the apparatus so as to sustain the proper liquid coolant level. Other coolant level maintenance methods, such as a float-control system, could be used but the pressure differential control method is preferred. One skilled in the art could also fill coolant containment space 109 to a desired level, disconnect tunnel embodiment 100 from the external coolant source, and operate the apparatus disconnected from any external coolant source.

Figure 6:
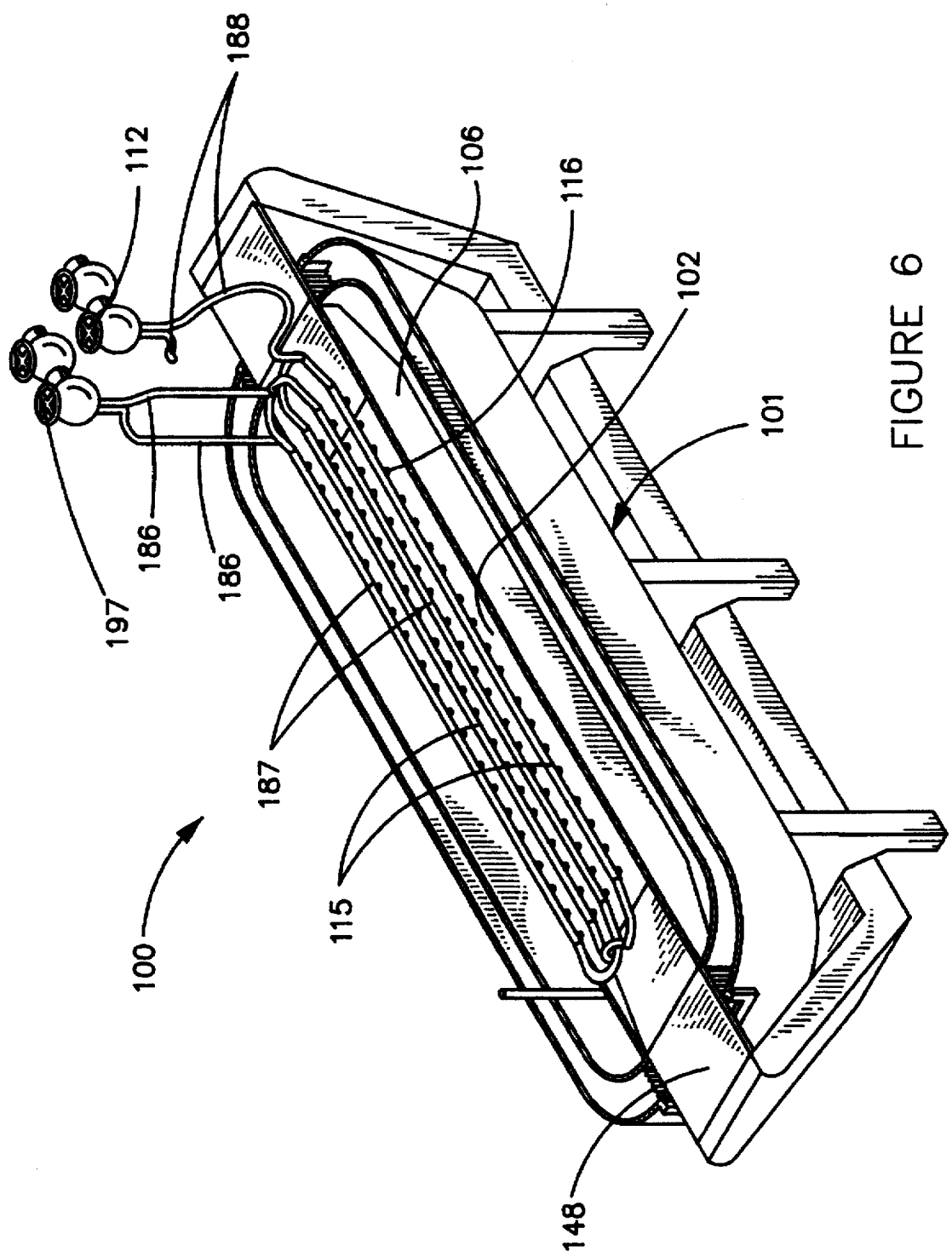
FIG. 6 is a perspective view of a horizontal embodiment of the invention. The top section has been cut away to show an embodiment of the routing of the dispersion tubing.

As shown in FIGS. 2 and 6, liquid transfer means will include line 186 which originates in the lower portion of coolant containment space 109 and runs upwards through vapor ullage space 110 via vacuum jacket 163 to three-way valve 197. Line 186 exits valve 197 and passes back through vacuum jacket 163 into liquid dispersion tubes 187 which extend along the length of cooling chamber 102 at a height of about one inch below top 108. Although the capability to use liquid spray is preferable, one could practice the invention without such a capability.

It is preferable that the apparatus include a means for directing the vapors collected in coolant containment space 109 into cooling chamber 102 as will be described. However, one could practice the invention by simply collecting the vapors using a vapor collection means such as vapor transfer line 188 and routing the vapors to any desired area.

The means for directing the vapors into cooling chamber 102 will include vapor transfer line 188, which runs from ullage space 110 through vacuum jacket 163 to valve 112, and then exits valve 112 and passes back through vacuum jacket 163 to vapor dispersion tubes 115. As with liquid dispersion tubes 187, vapor dispersion tubes 115 run along the length of cooling chamber 102 at a height of about one inch below top 105. Preferably, the path of vapor transfer line 188 through coolant 61 is to be relatively long so that the temperature of the coolant vapor is essentially that of the liquid coolant when the coolant vapor enters vapor dispersion tubes 115. FIG. 6 shows one potential embodiment creating such a path. Vapor transfer line 188 is concentric to (and can be in contact with) the inner radius of one of the heads 107 prior to connecting to vapor dispersion tubes 115.

The use of liquid or vapor spray in cooling chamber 102 is particularly preferred because it will ensure a positive pressure differential between cooling chamber 102 and the ambient environment. This positive pressure differential is preferred because the low temperature surfaces of the cooling chamber act as a pump to draw in the external air and will condense and freeze any moisture in even low humidity air. For some applications the freezing of the moisture could damage the materials. This is why even home freezer doors are sealed.

As shown in FIGS. 2 and 6, liquid dispersion tubes 187 are parallel to each other and form a continuous path with the ends connected by a "U" section or are a single long tube bent into the same configuration. Vapor dispersion tubes 115 are similarly formed. In one embodiment, the tubes are supported by hooks 165 which are epoxy bonded to the top of the cooling chamber.

Both liquid and vapor dispersion 187, 115 may be drilled to provide circular spray ports (generally, $\frac{1}{32}$-in. to $\frac{1}{8}$-in. diameter) or be connected to adjustable spray nozzles 116. The size and placement of the spray nozzles will be determined by the exact applications which are anticipated. The upstream cooling efficiency will also affect the size and location of spray ports and nozzles. The tubing and spray system is designed to facilitate easy removal and accommodation of various spray quantities and applications. An important feature of the spray nozzles is that the spray patterns of either vapor or liquid coolant may be varied. Additionally, the nozzles may be closed or opened to spray selectively in designated sections of cooling chamber 102 as the products are conveyed through cooling chamber 102 or to provide various combinations of no spray, liquid spray, and vapor spray. It will be known to those skilled in the art to use different sizes of tubes, spray ports and nozzles to accommodate various materials.

It should also be noted that although a particular configuration of dispersion tubes 187, 115 has been shown one can construct dispersion tubes 187, 115 in many various configurations. One could even design vessel 101 with simple apertures which allowed communication of vapors from coolant containment space 109 to cooling chamber 102 via a pressure control means for each aperture. One could also construct dispersion tubes 187, 115 as hollow arcuate members which would fit more efficiently into cooling chamber 102. One could use various configurations of dispersion tubes 187, 115 in areas external to cooling chamber 102.

The liquid and vapor used in the spray systems may be supplied in other ways. Three-way valve 197 may be set so that liquid coolant from an external source may be routed into liquid dispersion tubes 187. Vapor from an external source can also be provided in a similar manner via three-way valve 112.

As shown in FIGS. 1 and 2 line 119 extends from ullage space 110 via vacuum jacket 163 and vacuum pressure gauge 120 to valve 121. Line 122 extends outward from valve 121. For positive pressure applications, line 122 may be used to transmit vapors from ullage space 110 to any desired area. For example, one skilled in the art could direct such vapors upstream from tunnel embodiment 100 for precooling of the materials. In such an application, line 122 would preferably be vacuum and SI insulated for minimal heat loss prior to entering the upstream cooling regions.

For negative pressure applications, such as non-conveyor vacuum freeze methods, line 122 will preferably be uninsulated to allow some ambient heating of the cold vapors which are pumped out of ullage space 110. In negative pressure treatment, liquid coolant 61 would be maintained at less than 1 atm (preferably 0.127 atm and lower for $LN_2$), by placing a vacuum on line 122.

Line 123 extends from ullage space 110, through vacuum jacket 163 to rupture disk assembly 124, pressure relief valve 125 and to a pressure control means such as variable pressure vent valve 126. The pressure control means is used to control the pressure in coolant containment space 109. Although variable pressure vent valve 126 is a particular preferred embodiment of a pressure control means, one could practice the invention with a simple manual valve used as a pressure control means.

Pressure relief valve 125 is designed to open and vent pressures exceeding 10% of the maximum allowed design pressure of inner shell 103. Rupture disk assembly 124 is designed to rupture if the pressure exceeds 20% of the maximum allowed pressure of inner shell 103 if pressure relief valve 125 has insufficient capacity to prevent overpressure or becomes inoperable. Additional pressure relief valves and rupture disk assemblies may be utilized as desired by the fabricator or to adhere to ASME and other Code guidelines.

Variable pressure vent valve 126 may be set at predetermined pressure levels up to the venting pressure setting of relief valve 125. The pressure setting of valve 126 plays an important role in the operation of this embodiment of the invention inasmuch as the pressures of the liquid coolant as well as those of the vapors in ullage space 110 are determined by the preset pressure levels of valve 126 when all other exit valves for either the liquid coolant or vapor are closed. Or, if the liquid coolant or vapors are dispersed via lines 186 or 188 to dispersion tubes 187 or 115 at pressures lower than the vent pressure setting of valve 126, the various pressures for the coolant in coolant containment space 109 may be controlled by the pressure setting of valve 126.

The pressure level of coolant 61 will indicate the corresponding temperature of the coolant which provides the primary lower surface cooling. The temperatures of the liquid coolant and vapors dispersed via dispersion tubes 187 and 115 are not controlled by the pressures in coolant containment space 109 when introduced into cooling chamber 102, but their spray velocities are. The temperature of the liquid or vapor spray is determined by the pressure of cooling chamber 102.

Higher coolant pressures, as may be preset using variable pressure vent valve 126, are used in some blast freezing operations, but are used primarily to generate higher liquid or vapor spray velocities for greater heat absorption.

Valve 126 will thus be used to set the temperature of lower surface 104 and to affect and control the primary cooling mode which is the liquid to vapor conversion of the equivalent heats of vaporization of the coolant. Negative (below 1-atm) pressure heats of vaporization equivalents may also be controlled by pulling a vacuum on coolant containment space 109 as discussed above, which provides even greater cooling capabilities.

As the pressure of the coolant is reduced to less than 1 atm lower temperatures are created at lower surface 104 and tunnel embodiment 100 will thus have greater heat absorption capability due to the higher heats of vaporization (or sublimation) of the coolant. As the pressure of the coolant is raised above 1 atm higher temperatures are created at lower surface 104 thus resulting in less directional cooling. However, higher liquid coolant and vapor velocities will be created and provide greater cooling capabilities using dispersion tubes 115, 187. This latter mode will probably be more suitable for embrittlement purposes, while the directional cooling mode will be more suitable for high-moisture or fragile food products.

An apparatus and method which manipulates coolant pressures to negative pressures to create greater direct contact directional cooling capabilities, or which creates warmer lower surface temperatures along with higher spray velocities for spray cooling capabilities is key to this invention and considered innovative by the inventor.

For freeze dry (or freeze vacuum) operations, the items are loaded into cooling chamber 102 and doors 138, 139 are attached and closed. All valves are closed with the exception of variable pressure vent valve 126 which is set to the open pressure level of 0 psig (1 atm). The materials may be ultrafrozen by lower plate cooling at different temperatures by presetting variable pressure valve 126 to the corresponding pressure levels for the desired temperatures. The excess vapors will exit through line 127 and can be used for upstream precooling of materials, for cooling of storage areas, or for any other suitable purpose. One may also use bottom surface cooling with vapor or liquid spraying, or both.

After sufficient time for cooling the materials has elapsed, valve 126 is closed and negative pressure (vacuum) pumping is begun by opening variable pressure valve 143 on door 138, and connecting line 171 to a vacuum pump (not shown). Negative pressure pumping is not begun until all of the material is below its freezing point since vacuum expansion of unfrozen liquid pockets may damage the products; however, after freezing and pumping begins, the product freezing rates are increased under vacuum due to the decreased pressure in cooling chamber 102 and forced sublimation will occur.

After freezing to minimum temperatures under vacuum, resulting in more rapid freezing rates, the materials may subsequently be placed in a commercially available vacuum chamber (not shown). This may be desirable because cold lower surface 104 of cooling chamber 102 will cause sufficiently low vapor pressure equivalents that continued drying or dehydration would require very long pumping times. Small frozen cell formations will be formed in cooling chamber 102 and should assure enhanced texture and palatability because of reduced large ice cell damage of food products. When the materials are placed into the second vacuum apparatus (not shown), the products are heated, at low temperatures, while under vacuum at pressures of about 50 to 500 microns (Hg). So long as the vacuum pressure does not exceed 4.7 mm Hg, the frozen water from the small-cell ice crystals sublimes instead of melting.

Another vacuum freeze method entails pumping from ullage space 110 by connecting line 127 to a vacuum pump (not shown). Other ullage space exits, such as line 122 or even fill port 117, could be used so long as a variable negative pressure valve and gauge are attached. After the items are loaded, in the same manner as for vacuum freeze operations, doors 138, 139 are attached and closed and all exit valves are closed, with the exception of valve 121. During the initial rigorous boiling of coolant 61, the exiting vapors are conducted to areas outside of tunnel embodiment 100 as desired. The low pressure levels corresponding to the desired lower than 1 atm temperatures of the coolant may be maintained by variable pressure valve 126 being connected to the vacuum pump (not illustrated).

Although it is preferable that bottom surface 104 of cooling chamber 100 be flat, one skilled in the art could construct bottom surface so that it was convex or concave or even had a wave-shaped cross-section. Similarly, vertical sidewalls 106 could also be curved and top 108 could be made with a curvature opposite from that shown or could be flat.

Figure 4:
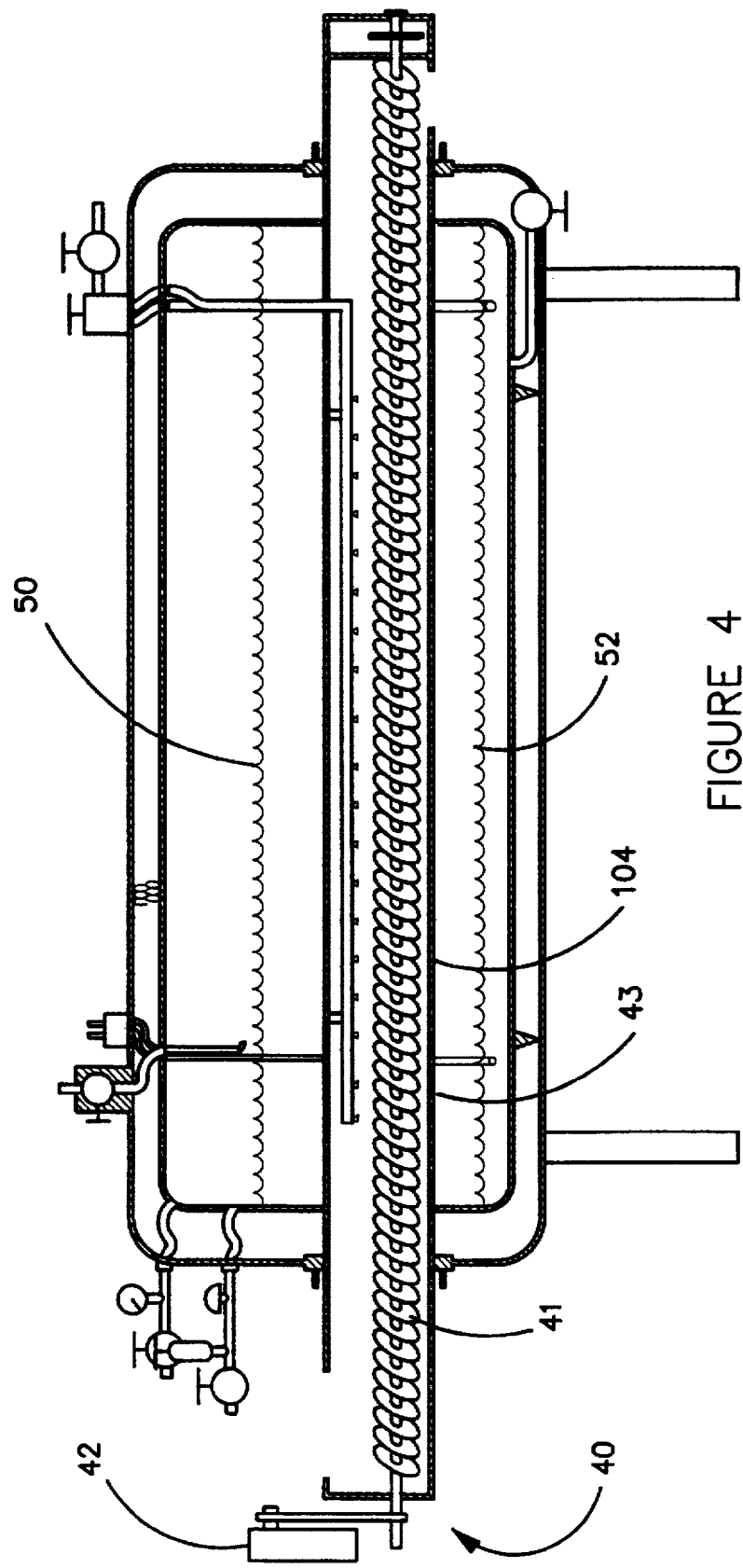
FIG. 4 is a sectional view of a horizontal embodiment of the invention with an embodiment of a screw auger conveyor.
Figure 5:
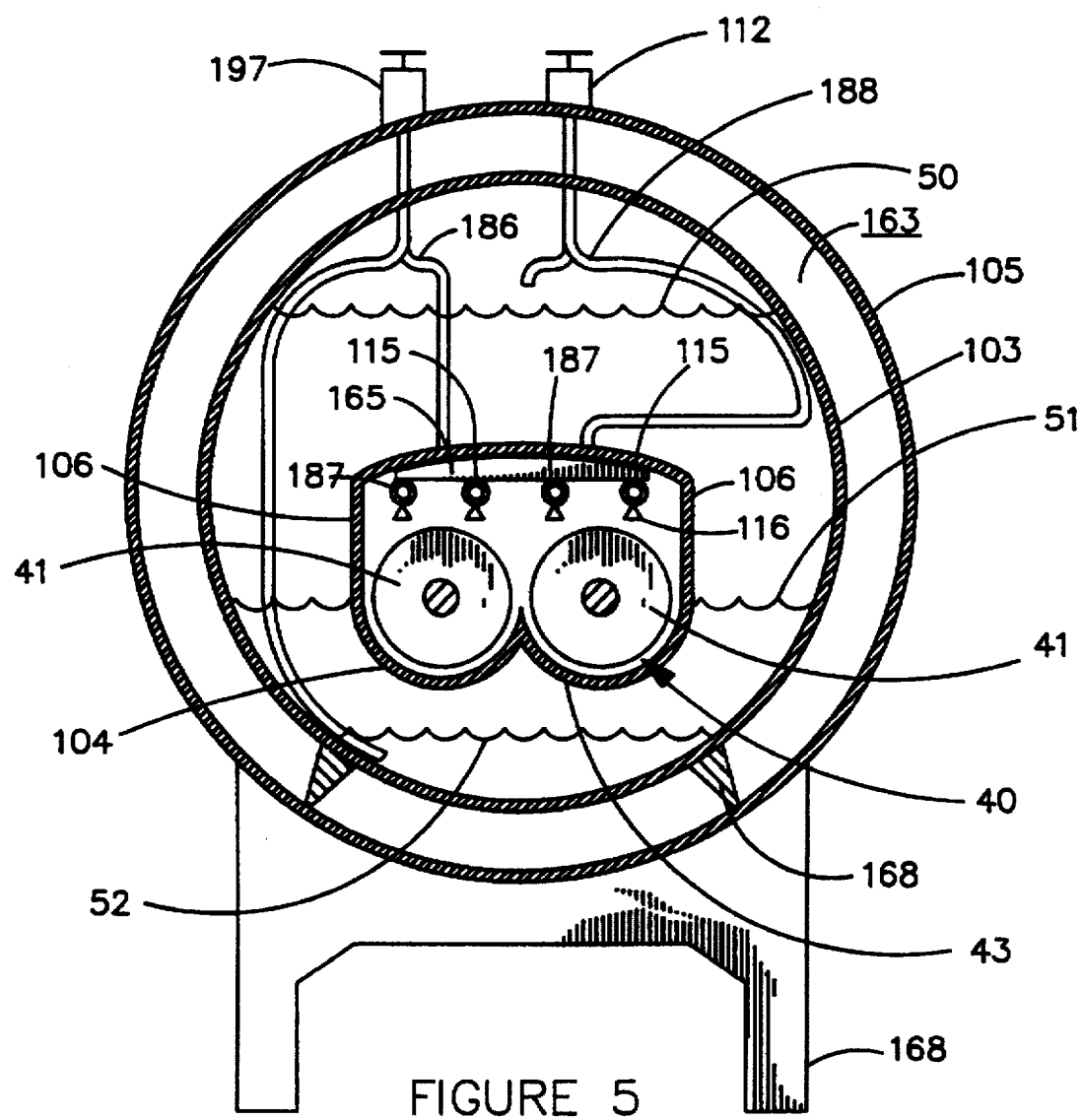
FIG. 5 is another sectional view of a horizontal embodiment of the invention with an embodiment of a screw auger conveyor.

FIG. 4 and 5 are two different sectional views of a tunnel embodiment of the invention with two possible embodiments of screw auger assembly 40. FIG. 5 is a sectional view of a double auger embodiment. FIG. 4 is a sectional view of a single auger embodiment which is preferred because better control can be had over the speed at which items travel through the tunnel, and therefore cooling times can be more accurately controlled.

Screw auger assembly 40 includes one or more augers 41 and auger motor 42. In small simpler versions screw auger assembly 40 could use even a hand crank to turn augers 41 instead of auger motor 42. Lower surface 104 doubles as the lower portion of auger tray 43 and will be curved to follow the profile of augers 41. Materials to be cooled will be placed into screw auger assembly 40. Although the embodiments in FIGS. 4 and 5 show one and then two augers 41, respectively, one skilled in the art could practice the invention with more than two augers 41, and could set the augers in various configurations.

In the embodiment depicted in FIGS. 4 and 5 auger tray 43 remains stationary as augers 41 turn. In another embodiment of screw auger assembly 40 auger 41 will be attached and turn together with auger tray 43, which will completely enclose auger 41 except at the ends. In such an enclosed version, auger tray 43 will be in close proximity with lower surface 104 to maximize the heat absorption via auger tray 43 and lower surface 104.

Figure 7:
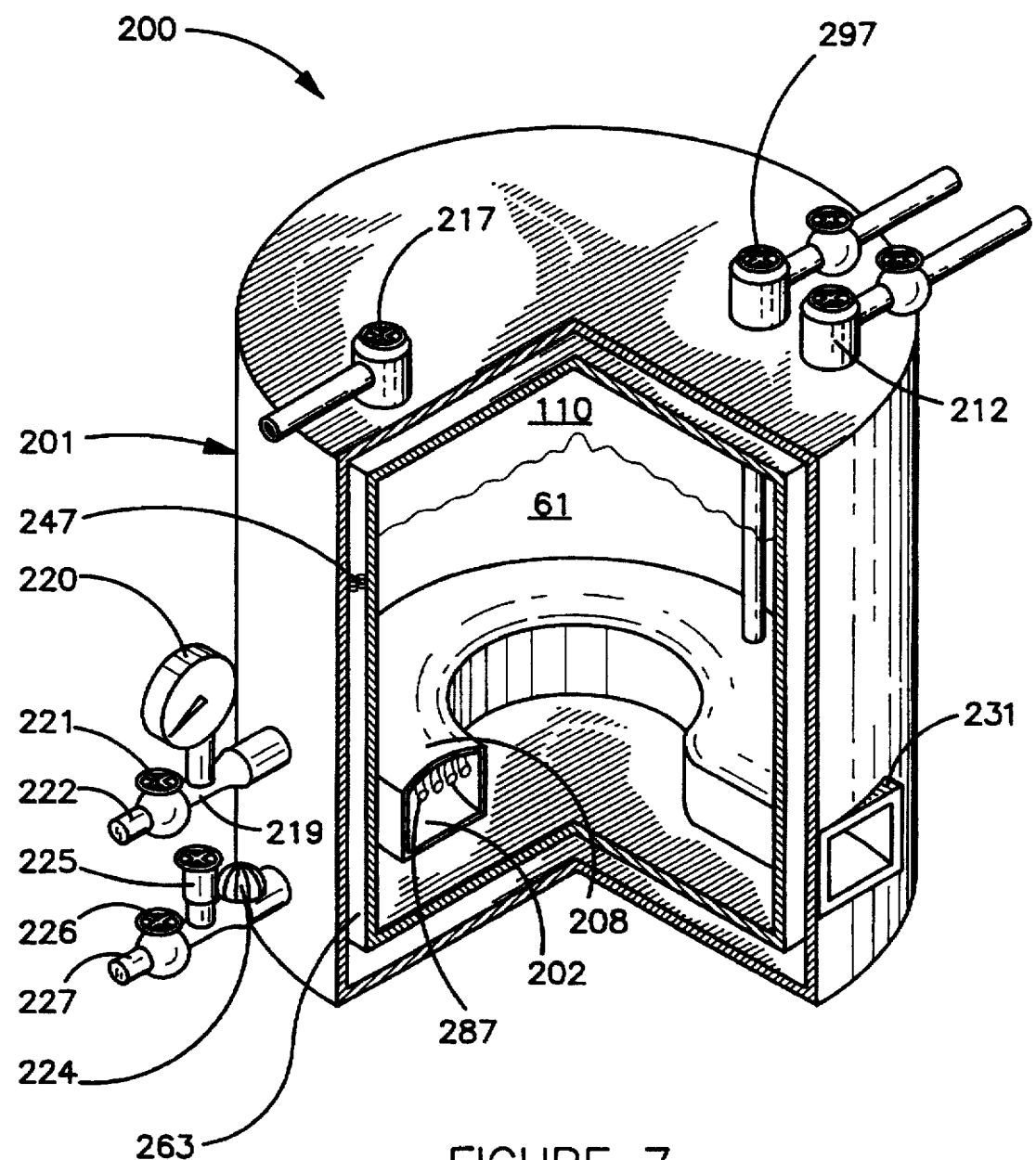
FIG. 7 is a cut-away perspective view of a circular tunnel embodiment of the invention.
Figure 8:
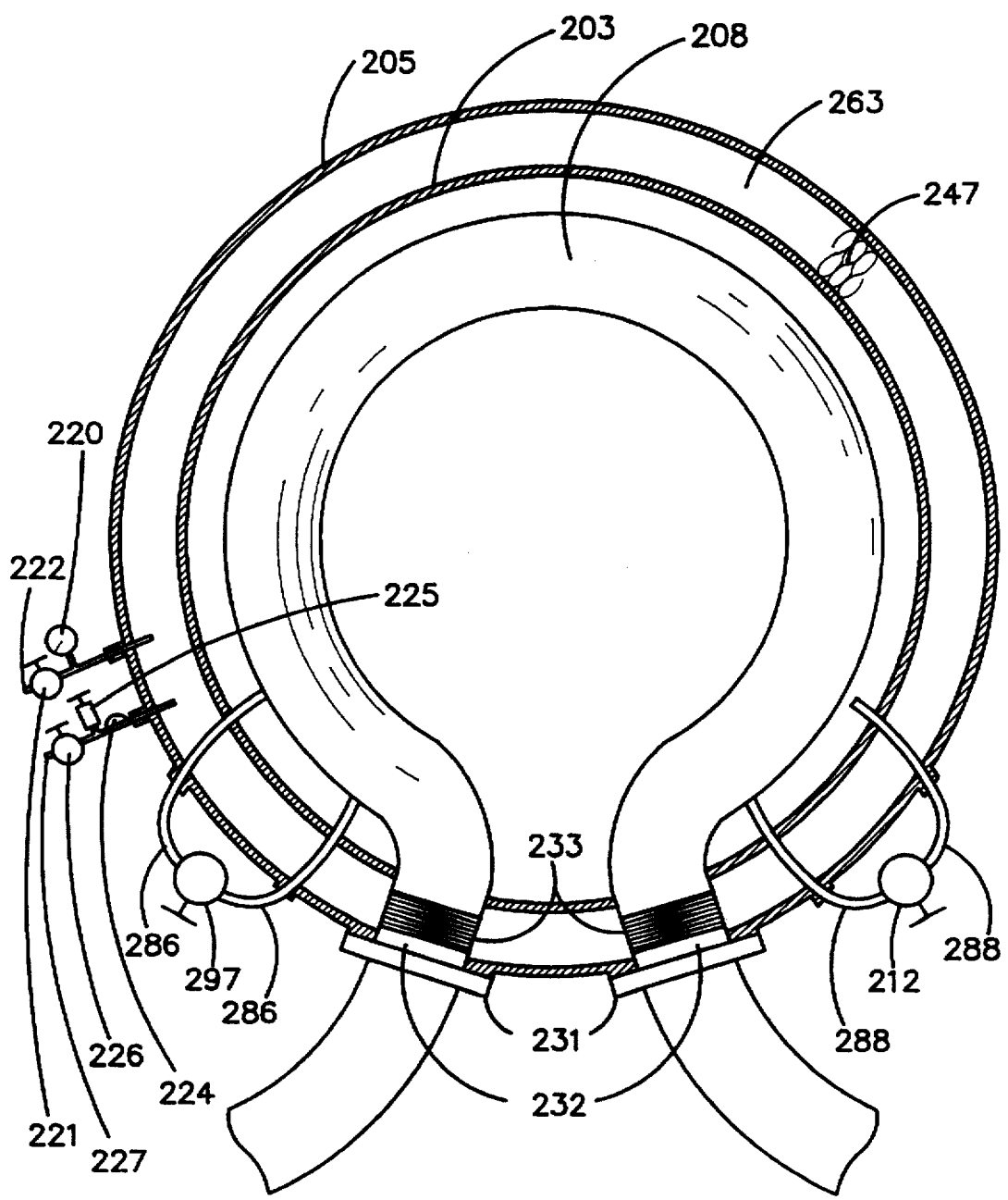
FIG. 8 is a sectional view of a circular tunnel embodiment of the invention.
Figure 9:
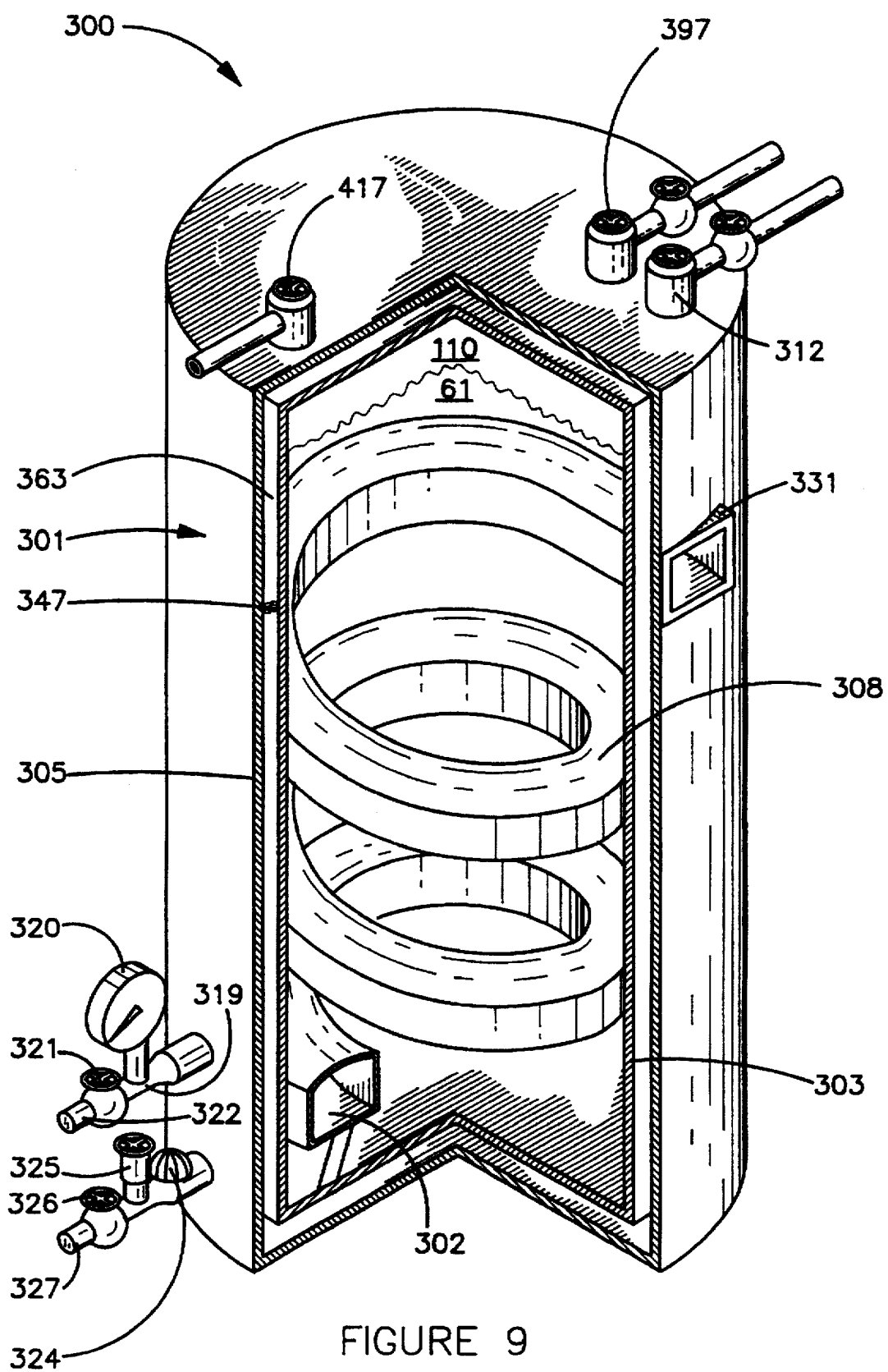
FIG. 9 is a sectional view of a spiral tunnel embodiment of the invention.

In addition to the tunnel embodiments just described, there are other embodiments which may be designed using the principles just described for tunnel embodiment 100. FIGS. 7 and 8 depict an embodiment of the invention which uses a circular tunnel cooling chamber 202 inside of vertical cylindrically shaped vessel 201. FIG. 9 depicts an embodiment of the invention which includes spiral shaped cooling chamber 302 inside of vertical cylindrically shaped vessel 301.

Figure 10:
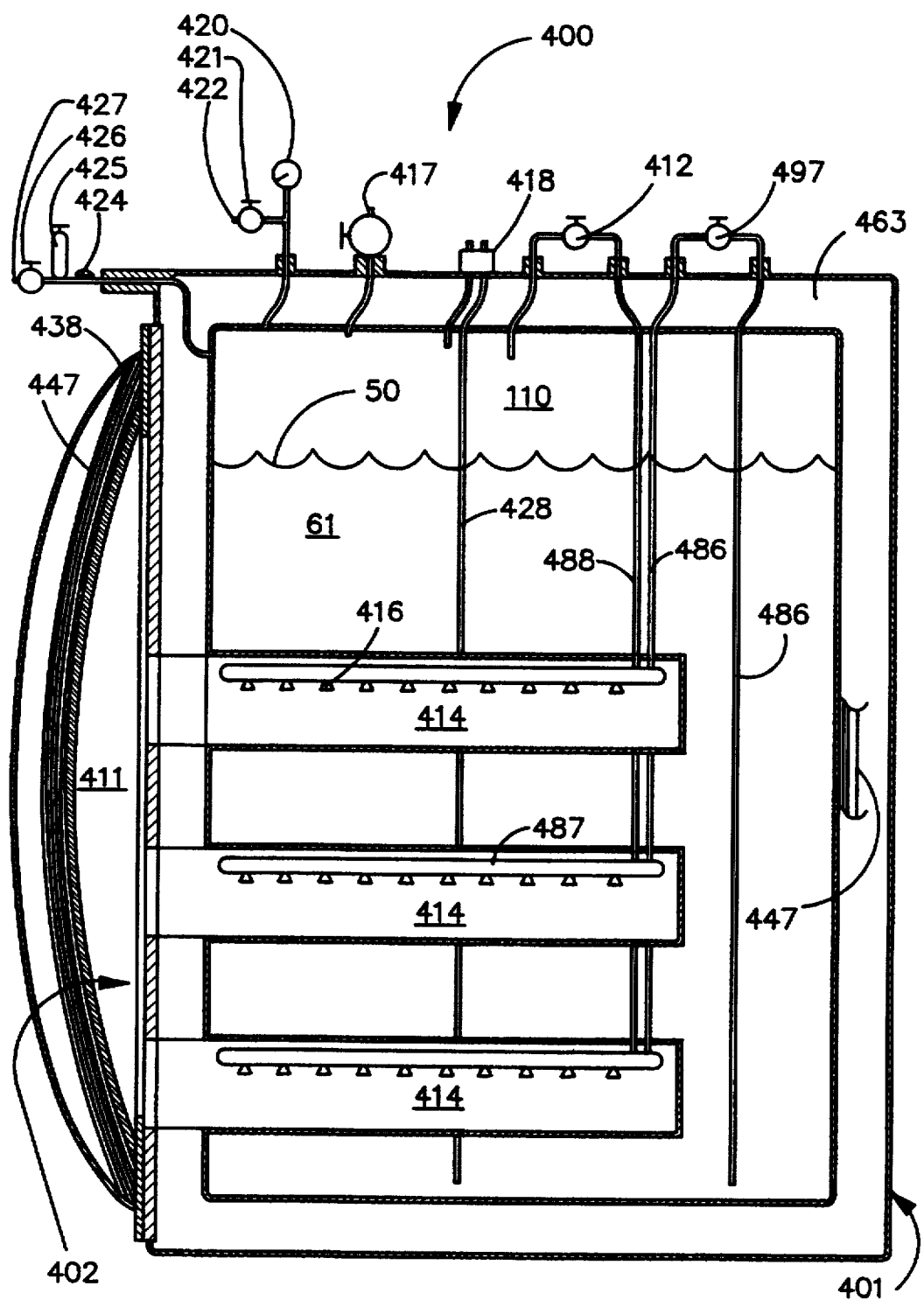
FIG. 10 is a sectional view of a multi-shelf embodiment of the invention.

FIG. 10 is a sectional view of the multi-shelf embodiment 400. Multi-shelf embodiment 400 will include cooling chamber 402 which will have one or more shelf compartments 414. Combined entry and exit port 411 will be closed with door 438, although one could also use flaps (not shown). Although the embodiment shown uses a combined entry/exit port 411, one could also construct multi-shelf embodiment 400 with entry port 411 at one end and exit port 411 at the other end of each shelf compartment 414. One could also have separate doors 438 for each compartment, instead of the single door 438 shown.

The figures for these other embodiments use corresponding numerical designations to indicate components similar in function to those of the tunnel embodiments. For example, outer shell 105 is shown for the tunnel embodiment while outer shell 305 is shown for the spiral embodiment.

In all of the embodiments shown and described herein, the coolant containment space can be used for coolant storage and preclude the need for expensive coolant storage stations. This is especially true of the vertical cylinder embodiments. Those skilled in the art will also realize that one could practice the invention with a tunnel which passed through a vertically oriented cylinder, preferably the lower section. Such an embodiment would be especially appropriate if one desires to eliminate the need for coolant storage stations.

All embodiments offer as the primary cooling method the use of the heat of vaporization equivalent of the coolant. The vapors created as heat is absorbed from the materials are available for use as desired.

There are of course other alternate embodiments which are obvious from the foregoing descriptions of the invention, which are intended to be included within the scope of the invention, as defined by the following claims.

I claim:

1. An apparatus for cooling or freezing materials using low or cryogenic temperature coolants, comprising:
   a) a vessel having a coolant containment space, said coolant containment space containing said coolant;
   b) a cooling chamber in which materials to be cooled may be placed, said cooling chamber having a lower surface which is immediately adjacent to said coolant containment space, said cooling chamber being separated from said coolant containment space such that a pressure differential may be established between said cooling chamber and said coolant containment space;
   c) a means for controlling the pressure within said coolant containment space;
   d) a vapor collection means for collecting vapors created in said coolant containment space as heat is absorbed by the coolant.

2. The apparatus in claim 1, wherein said cooling chamber is disposed within said vessel and said apparatus further comprises at least one entry/exit port for placing said materials into, and removing said materials from, said cooling chamber.

3. The apparatus in claim 2, further comprising removable doors for sealing said ports of said cooling chamber.

4. The apparatus in claim 2, wherein
   (1) said vessel is substantially cylindrical; and
   (2) said cooling chamber is a tunnel which is disposed in said vessel.

5. The apparatus in claim 2, wherein
   (1) said vessel is substantially cylindrical and has a long axis which is vertically oriented; and
   (2) said cooling chamber is a tunnel which is horizontally oriented, is circularly shaped, and is disposed in the lower portion of said vessel.

6. The apparatus in claim 2, wherein
   (1) said vessel is substantially cylindrical and has a long axis which is vertically oriented; and
   (2) said cooling chamber is a spirally configured tunnel.

7. The apparatus in claim 4, wherein said vessel further comprises:
   (1) an inner shell defining said coolant containment space;
   (2) an outer shell;
   (3) a vacuum jacket between said inner shell and said outer shell; and
   (4) heat reflective, multi-layer insulation in said vacuum jacket.

8. The apparatus in claim 1, further comprising:
   a means for directings said coolant vapors collected in said coolant containment space.

9. The apparatus in claim 8, wherein said means for directing said coolant vapors further comprises a vapors dispersion tube for directing vapors into said cooling chamber or to areas external to said cooling chamber.

10. An apparatus as recited in claim 1, further comprising:
    a means for transferring a portion of said liquid coolant in said coolant containment space.

11. The apparatus in claim 10, wherein said means for transferring a portion of said liquid coolant further comprises a liquid dispersion tube for directing said liquid into said cooling chamber or to areas external to said cooling chamber.

12. The apparatus in claim 1, further comprising:
    a) entry and exit ports for placing said materials into, and removing said materials from, said cooling chamber; and
    b) a conveyor means for conveying materials into and out of said cooling chamber.

13. The apparatus in claim 12, wherein said conveyor means comprises a conveyor assembly having a conveyor belt.

14. The apparatus in claim 13, wherein said cooling chamber is a tunnel disposed within said vessel, said tunnel further comprising at least one sloped section at either said entry port or said exit port.

15. The apparatus in claim 12, wherein said conveyor means comprises a screw auger assembly.

16. An apparatus for cooling or freezing materials using low or cryogenic temperature coolants, comprising:
    a) a vessel having a coolant containment space, said coolant containment space containing said coolant;
    b) a cooling chamber in which said materials to be cooled may be placed, said cooling chamber having a at least one shelf compartment, each said shelf compartment comprising a lower surface which is immediately adjacent to said coolant containment space, said cooling chamber being separated from said coolant containment space such that a pressure differential may be established between said cooling chamber and said coolant containment space;
    c) a means for controlling the pressure within said coolant containment space;
    d) a vapor collection means for collecting vapors created in said coolant containment space as heat is absorbed by the coolant; and
    e) at least one entry/exit port providing access to said shelf compartments.

17. A method for cooling or freezing materials using low or cryogenic temperature coolants, comprising:
    (1) providing an apparatus, said apparatus comprising:
       (a) a vessel having a coolant containment space;
       (b) a cooling chamber in which materials to be cooled may be placed, said cooling chamber having a lower surface which is immediately adjacent to said coolant containment space, said cooling chamber being separated from said coolant containment space such that a pressure differential may be maintained in said cooling chamber and said coolant containment space;
       (c) a means for controlling the pressure within said coolant containment space;
       (d) at least one entry/exit port for placing materials into, and removing materials from, said cooling chamber; and
       (e) a vapor collection means for collecting vapors created in said coolant containment space;
    (2) introducing a quantity of said coolant into said coolant containment space; and
    (3) placing said materials into said cooling chamber.

18. The method in claim 17 further comprising:
    (4) controlling the pressure in said coolant containment space such that the primary cooling of said materials will be by absorption of heat from said materials by said coolant through said lower surface.

19. The method in claim 18 further comprising:
    (5) collecting vapors produced by heat absorption by said coolant.

20. The method in claim 19 further comprising:
    (6) directing said collected vapors.

21. The method in claim 17 further comprising:
    (4) providing said apparatus with a cooling chamber which is disposed within said coolant containment space;

(5) maintaining the level of said coolant such that said coolant completely encompasses said cooling chamber;

(6) providing a sufficient vapor ullage space in said coolant containment space above said coolant level; and (7) collecting vapors from said coolant.

22. The method as recited in claim 17 further comprising:

(4) using pressure created by the vapors in said coolant containment space to direct liquid coolant from said coolant containment space.

23. The method in claim 17 further comprising:

(4) maintaining the pressure in said coolant containment space at greater than 1 atm.

24. The method in claim 17 further comprising:

(4) maintaining the pressure in said coolant containment space at less than 1 atm.

25. The method in claim 24 further comprising:

(5) closing off said entry and exit ports with doors;

(6) loading said materials into said cooling chamber prior to closing off said ports; and (7) directing said collected vapors.

26. The method in claim 25 further comprising:

(8) connecting a vacuum pump to said cooling chamber and pumping said cooling chamber to low pressure levels.

27. The method in claim 26, further comprising:

(9) returning said coolant containment space and said cooling chamber to 1 atm pressure levels;

(10) opening said doors and removing said materials from said cooling chamber; and

(11) performing subsequent vacuum freeze operations on said materials.

\* \* \* \* \*

UNITED STATES PATENT AND TRADEMARK OFFICE
CERTIFICATE OF CORRECTION

PATENT NO. : 5,715,688

DATED : February 10, 1998

INVENTOR(S) : Robert H. Jones, III

It is certified that error appears in the above-identified patent and that said Letters Patent is hereby corrected as shown below:

In column 1, line 6, please add:

--This is a continuation-in-part of copending application Serial Number 08/267,782 filed on June 28, 1994, now U.S. Patent Number 5,520,004, which is hereby incorporated by reference into this application.--

Signed and Sealed this

Twenty-first Day of July, 1998

Attest:

BRUCE LEHMAN

Attesting Officer

Commissioner of Patents and Trademarks

Disclaimer

5,715,688—Robert H. Jones, III, Lafayette, LA. APPARATUS AND METHODS FOR CRYOGENIC TREATMENT OF MATERIALS. Patent dated February 10, 1998. Disclaimer filed May 24, 2002, by the assignee, Intellect Consulting Inc.

Hereby enters this disclaimer to claims 1-27 of said patent.

*(Official Gazette, September 10, 2002)*